US012108028B2

(12) United States Patent
Robinson

(10) Patent No.: US 12,108,028 B2
(45) Date of Patent: Oct. 1, 2024

(54) SIGNAL VARIATION MEASUREMENT

(71) Applicant: HITOMI LTD, Cookham Dean (GB)

(72) Inventor: James Neil Robinson, Bourne End (GB)

(73) Assignee: HITOMI LTD, Cookham Dean (GB)

( * ) Notice: Subject to any disclaimer, the term of this patent is extended or adjusted under 35 U.S.C. 154(b) by 38 days.

(21) Appl. No.: 17/753,679

(22) PCT Filed: Sep. 7, 2020

(86) PCT No.: PCT/EP2020/074946
§ 371 (c)(1),
(2) Date: Mar. 10, 2022

(87) PCT Pub. No.: WO2021/048052
PCT Pub. Date: Mar. 18, 2021

(65) Prior Publication Data
US 2022/0345689 A1    Oct. 27, 2022

(30) Foreign Application Priority Data

Sep. 10, 2019 (GB) .................................... 1913049

(51) Int. Cl.
*H04N 17/00* (2006.01)
*H04N 17/04* (2006.01)
(52) U.S. Cl.
CPC ......... *H04N 17/004* (2013.01); *H04N 17/045* (2013.01)
(58) Field of Classification Search
CPC .................................................. H04N 17/004
USPC ........................................................ 375/224
See application file for complete search history.

(56) References Cited

U.S. PATENT DOCUMENTS

| 3,818,445 | A | * | 6/1974 | Neville | G06V 10/24 |
| | | | | | 382/293 |
| 2004/0239310 | A1 | * | 12/2004 | Oshima | G01R 31/31922 |
| | | | | | 324/750.01 |
| 2005/0219366 | A1 | | 10/2005 | Hollowbush et al. | |
| 2006/0177178 | A1 | * | 8/2006 | Greiner | G02B 6/29326 |
| | | | | | 385/37 |

(Continued)

FOREIGN PATENT DOCUMENTS

| EP | 0888019 A1 | 12/1998 |
| EP | 3171593 A1 | 5/2017 |
| GB | 2437123 A | 10/2007 |

OTHER PUBLICATIONS

GB Search Report for GB Application No. 1913049.1 mailed Jul. 20, 2020.

(Continued)

*Primary Examiner* — Lihong Yu
(74) *Attorney, Agent, or Firm* — MASCHOFF BRENNAN

(57) ABSTRACT

A method for identifying variations introduced in signals transmitted over a signal path, the method comprising sending, over the signal path, one or more test patterns with functional features to a test pattern analyser, wherein said functional features are for determining aspects of variations introduced in the one or more test patterns during transmission over the signal path; and including a data pattern in at least one of the test patterns prior to said sending, said data pattern comprising meta-data on functional features of the at least one test pattern.

18 Claims, 6 Drawing Sheets

(56) References Cited

U.S. PATENT DOCUMENTS

| | | | | |
|---|---|---|---|---|
| 2009/0138189 A1* | 5/2009 | Kim | .................... | G08G 1/0104 |
| | | | | 701/117 |
| 2012/0287288 A1 | 11/2012 | Steinberg et al. | | |
| 2013/0057703 A1* | 3/2013 | Vu | ...................... | H04N 17/004 |
| | | | | 348/180 |
| 2016/0198152 A1* | 7/2016 | Chin | ....................... | G06F 11/30 |
| | | | | 725/107 |
| 2016/0373615 A1* | 12/2016 | Chen | ............... | H04N 21/43072 |
| 2018/0297863 A1* | 10/2018 | Decker | .................. | C02F 1/685 |
| 2019/0051060 A1* | 2/2019 | Rapeta | .................. | H04R 29/00 |
| 2019/0104285 A1* | 4/2019 | Medvec | .............. | B60Q 1/2665 |

OTHER PUBLICATIONS

International Search Report for International Application No. PCT/EP2020/074946 mailed Nov. 19, 2020.

\* cited by examiner

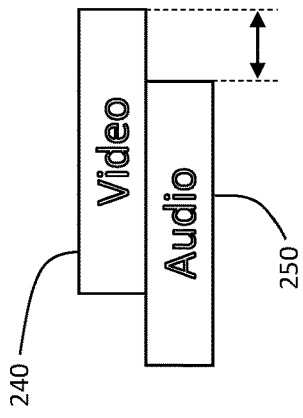
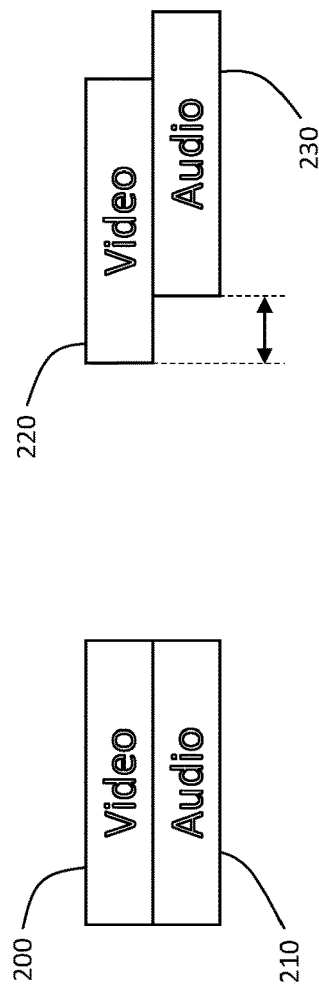
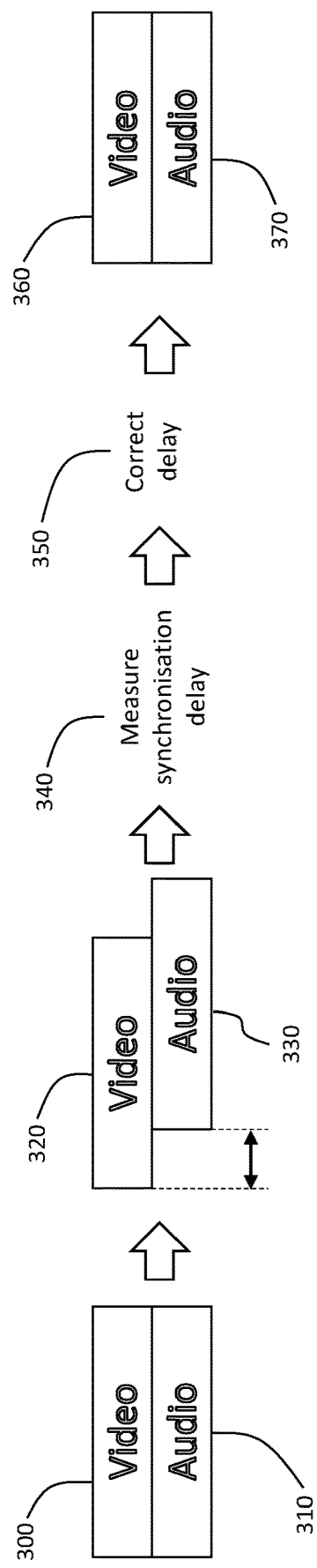

SIGNAL VARIATION MEASUREMENT

TECHNICAL FIELD

The present invention relates to identifying variations introduced in signals sent over a signal path and in particular to sending information regarding test patterns used to compensate for such variations, from a generating device to an analysing device.

BACKGROUND

In television broadcasting, an audio signal and a video signal may be transmitted across a broadcast network. Typically, the signals are sent over a processing chain or a chain of equipment before finally arriving at a signal receiver. During such transmission, the audio and video signals may each be subject to, for example, differing amounts of temporal delay, colour distortions, gamma distortions, frequency content distortions, excessive quantisation, or incorrect routing of signals, causing distorted versions of the audio or video to be received. This means that at the receiving end of the broadcast network, the signals are not synchronised with each other or are otherwise corrupted. This can be undesirable for many reasons.

For example, in a video in which an actor is speaking, the movement of the lips of the actor as visible in the video is not synchronised with the sound of the words being spoken by the actor. This is referred to as "lip-sync" error. In another example, the colours of the video may have been incorrectly converted from one colour space to another causing the resultant image not to appear as intended. In yet another example, conversion between HDR (High Dynamic Range) and SDR (Standard Dynamic Range) may have been incorrectly processed causing incorrect gamma to be applied to the picture making dark or light areas of the picture lose their detail. In another example the image might have been quantised with too few bits causing banding in gradient regions, which is especially a problem in HDR pictures. In another example the picture may have been overly filtered causing lack of detail in the received image. In another example meta-data associated with the video such as closed caption data may have been lost, corrupted, or mistimed.

In a scenario such as a football match, the game may be captured from many different locations in the stadium, so that viewers of the captured footage can see the game from many different angles. One camera may be located above the stadium, another camera may be located on a north side of the stadium, and other cameras may be located respectively on south, east or west sides of the stadium.

As in other scenarios, the video signal and the audio signal as captured in each individual location around the stadium must be synchronised with each other. However, in the scenario of the stadium, an additional requirement is that the signals of the plurality of cameras around the stadium must also be synchronised with each other.

A common method to measure variations introduced in signals transmitted over a signal path, such as audio-video delay or colour distortion in a television signal is the use of audio and video "test patterns".

In the example of measuring audio-video delay, an audio test pattern and a video test pattern are developed such that the audio test pattern has sounds that are to occur at a known timing relationship to certain events of the video test pattern. The test patterns are sent over the broadcast network to a test pattern analyser. A plurality of test pattern analysers may be deployed, at different points in the broadcast network chain.

Each test pattern analyser is capable of determining the delay between the audio signal and the video signal by processing the temporal development of the audio and video test patterns as received at any point in the broadcast network. For example, the delay between a particular sound in the audio test pattern and a particular event in the video test pattern can be used to calculate audio-video delay.

The delay between one video signal and another video signal may also be determined in a similar way, using video test patterns comprising timed events. The delay between different audio signals may also be determined in a similar way, using audio test patterns comprising timed events.

Any delay or distortion of an audio signal or a video signal can be determined by means of said audio and video test patterns. For example, colour test panels in a video test pattern may provide information on how the colour content of the video signal changed during transmission over the signal path. Frequency content test panels in a video test pattern can provide information on how the frequency content of the video signal changed over a signal path. Once this information has been made available by means of the test patterns, the delay or distortion can then be corrected.

A problem with using audio and video test patterns for measurement of such delay/distortions to the signal is that the broadcast chain may alter the signals in such a way that it is difficult to locate features of the video test pattern after it has passed through the broadcasting system. For example, the test pattern analyser may not be able to identify the location of certain elements of a video test pattern that are important to measure the delay with respect to an audio test pattern. Similarly, the test pattern analyser may not be able to locate colour test panels of the video test pattern that are needed to determine colour distortion. Further, the test pattern analyser may not know which tests are included in the video test pattern.

The video test pattern signal may be altered or transformed in many ways during transmission. Such transformations may include, for example, scaling, aspect ratio conversion, conversion of the signal from one resolution to another (spatial resampling), frame rate conversion (temporal resampling), quantisation, colour space conversions, and/or changes to the gamma curve used.

In some implementations, the video test pattern is displayed on a screen such as a computer monitor or a smartphone display, wherein the screen is itself filmed by a camera. For example, a smartphone may be configured to display the video test pattern, and the smartphone may then be held in front of the camera so that the camera captures the video test pattern being displayed by the smartphone. In this case, the video test pattern as displayed by the smartphone and as captured by the camera is used in the delay/distortion measurement process. In such scenarios, if the smartphone (or other electronic device) is held in front of the camera (for example, by a human or a tripod) the video test pattern as displayed by the smartphone and as captured by the camera may be subject to further distortions, such as rotation, scaling or perspective distortions.

Similar distortions may also be present in virtual studios where an image is scaled onto a wall or other surface within a resultant image, wherein the virtual studio is part of the broadcast chain to be tested.

In addition to delays or distortions of the video test pattern, the audio test pattern may also be delayed/distorted during transmission.

The inventor has appreciated the problems involved in identifying, locating and using spatial and temporal test features in video test patterns and in using features in audio test patterns. In particular, locating or otherwise identifying test pattern features is more difficult after distortions are introduced in the test patterns after the audio or video signals are transmitted across a broadcast network. Toward this end, the inventor has invented a product and a scheme for overcoming these problems.

In the present disclosure, the terms functional "elements", "features" or "regions of interest" are used interchangeably to refer to the same general concept of a portion of a test pattern that is usable to identify delay/distortions in the test pattern, such as temporal delay, colour distortions or frequency distortions.

SUMMARY OF THE INVENTION

According to a first aspect of the present invention, there is provided a method for identifying variations introduced in signals transmitted over a signal path, the method comprising:

sending, over the signal path, one or more test patterns with functional features to a test pattern analyser, wherein said functional features are for determining aspects of variations introduced in the one or more test patterns during transmission over the signal path; and including a data pattern in at least one of the test patterns prior to said sending, said data pattern comprising meta-data on functional features of the at least one test pattern.

Advantageously, by including a data pattern in one or more of the test patterns, information useful in identifying the content of the original pattern and overcoming any delay/distortion of the test pattern signals is made available to the analyser, for example at an intermediate point or the end of the broadcast chain. For example, this information could help the analyser to identify and locate functional regions of interest in a video test pattern, thereby identifying which measurement or measurements can be made or improving the accuracy of the measurement being made.

In some embodiments, at least one functional feature of a first test pattern is temporally related to a functional feature of a second test pattern, and wherein said analyser determines a delay between received versions of the first test pattern and the second test pattern by means of said temporally related functional features and by means of said data pattern.

Advantageously, the data pattern provides information relating to temporally related functional features of a first test pattern signal and a second test pattern signal. For example, the information provided may relate to the spatial location of temporally changing features of a video test pattern.

In a preferred embodiment, at least one of said one or more test patterns comprises a video test pattern. Thus, the data pattern can be used to identify functional regions in the video test pattern, such as regions corresponding to temporally varying characteristics, or colour test panels.

In some embodiments, the data pattern comprises information indicative of the spatial location of functional features of the video test pattern. Functional features of the video test pattern are elements of the video test pattern that serve some purpose. For example, a flashing element of a video test pattern may serve the purpose of delay measurement between a corresponding peak of an audio test pattern. As another example, a colour test panel may serve the purpose of detecting changes to the colour content of the video test pattern after transmission.

In some embodiments, the information comprises the location of the functional regions of interest in relation to each other, and/or the location of the functional regions of interest in relation to edges of the video test pattern. Advantageously, this helps the test pattern analyser to locate aspects of the video test pattern even if they were subject to distortion, such as spatial translation, scaling or rotation.

In some embodiments, the functional features of the video test pattern comprise functional features temporally related to functional features of at least one other test pattern. As described above, this may be, for example, a flashing element of the video test pattern that is to be synchronised with a corresponding event in an audio test pattern. Any temporal feature of the video test pattern that is comparable with a temporal feature of, for example, an audio test pattern, in measuring the delay between the video and audio test patterns, can be termed a characteristic that is "temporally related" to a characteristic of the audio test pattern.

In some embodiments, the functional regions of interest comprise one or more test panels whose geometry is useful for compensating for distortion of the video test pattern. In some embodiments, the functional regions of interest comprise one or more colour test panels whose colour is useful for compensating for colour changes of at least portions of the video test pattern.

In some embodiments, the data pattern comprises information on the aspect ratio of the video test pattern, the height of the video test pattern, and/or the width of the video test pattern. Again, this will help in locating functional elements of the video test pattern.

In some embodiments, the functional regions of interest comprise the data pattern itself. In other words, the data pattern may provide information on its own location. This can form a useful reference point for the location of other test elements.

In a preferred embodiment, at least one of the first test pattern signal and/or the second test pattern signal comprises an audio test pattern. Thus, characteristics in a video test pattern that are temporally related to characteristics of an audio test pattern can be used to measure the delay between a video signal and an audio signal.

In some embodiments, the data pattern comprises information on an absolute value of the current time and/or a source of the absolute value of the current time. This can be used to synchronise multiple test pattern generators. For example, in a situation where a plurality of test pattern generators are used to synchronise cameras located in disparate geographical locations such as locations around a football stadium, the test pattern generators can embed absolute time value information in the data pattern to ensure that the signals originating from the different locations can be synchronised.

In some embodiments, the data pattern comprises information indicative of a generator delay between the audio test pattern and the video test pattern, wherein said generator delay originates from a test pattern generator. The value of the generator delay may be part of calibration data of the test pattern generator, wherein said calibration data is stored in the test pattern generator, or, in a server connected to a communications network that is accessible to the test pattern generator. The calibration data may be stored in the test pattern generator, for example, at manufacture of the test pattern generator. Advantageously, the stored value of the generator delay can be used to compensate for the delay caused by the test pattern generator itself.

In some embodiments, the data pattern comprises information on one or more of:

functional features usable to detect changes in the frequency content of a test pattern;

functional features usable to detect changes in the gamma characteristics of the test pattern;

functional features usable to detect changes in the quantisation of the test pattern;

the identity of elements in the test audio pattern and/or in the test video pattern;

the frame rate of the video test pattern and/or the audio test pattern; and the actual, preferred and/or minimum version of the software, firmware and/or hardware of a or the test pattern generator.

Advantageously, the data pattern provides information relating to functional features of the test pattern signals which can then be used to assist in determination of changes in colour, frequency content, gamma characteristics, quantisation or other measurable signal distortions or delay.

In some embodiments, the data pattern comprises a binary pattern.

In some embodiments, the data pattern comprises a two-dimensional code matrix, such as a QR-code. Advantageously, a QR-code is space efficient and stores a large amount of information and has inherent error resilience.

In some embodiments, the data pattern comprises a barcode. Advantageously, in applications wherein the data pattern is comprised of relatively fewer bits, a barcode may be more economical.

In some embodiments, the data pattern is comprised of coloured blocks. For example, different combinations or patterns of colour may represent different data or relate to different information. Coloured blocks may be able to encode large amounts of information.

In some embodiments, the data pattern comprises an audio tone burst. For example, the audio pattern may include a sine-wave or sine-waves that are digitally modulated to carry information; many modulation techniques may be employed for example: Phase Shift Keying (PSK), Quadrature Phase Shift Keying (QPSK), Quadrature Amplitude Modulation (QAM), Amplitude Shift Keying (ASK) or Frequency Shift Keying (FSK).

In some embodiments, the data pattern varies over time, so that said information in the data pattern is dynamic. Thus, as the test video pattern and test audio pattern are subject to varying non-linearities over time, the QR code is updated accordingly. For example, this keeps the information, useful for locating functional features of a test pattern, up-to-date with the changing properties of the transmission path over which the audio and video test patterns are transmitted.

In some embodiments, a test video pattern, a test audio pattern and a data pattern are generated, displayed and/or played on a multi-purpose mobile computing device. This allows greater flexibility in the audio-video synchronisation process. For example, in an application where live audio-video is broadcast from a football game, a multi-purpose computing device can be used "in-field" to generate, play and display the audio and video test patterns; the patterns can then be captured by a camera and a microphone, and subsequently transmitted to an analyser so that the measured synchronisation determined by the analyser can be used to correct any unwanted delay whilst remaining "in-field" near the football match. In other words, by means of a multi-purpose mobile computing device, the audio-video synchronisation measurement can be performed at any (remote) location.

In a preferred embodiment, the test video pattern, test audio pattern and data pattern are generated, displayed and/or played on a smartphone or on a tablet. Smartphones and tablets are currently popular multi-purpose mobile computing devices. It is considered that the method of the present invention can be performed using, for example, an Apple iPhone. The iPhone may run an "app" that is capable of generating, playing and displaying test audio patterns, test video patterns and data patterns. Advantageously, a cameraman may use his own personal iPhone in the audio-video synchronisation process, thus obviating the need for a dedicated piece of hardware for the process of generating, playing and displaying the audio test pattern, the video test pattern or the data pattern.

In some embodiments, the data embedded in the data pattern is encrypted.

In some embodiments, the data pattern comprises an identity block and one or more data blocks, wherein the identity block identifies the data pattern and the one or more data blocks provide(s) a payload of the data pattern.

According to a second aspect of the invention, there is provided a test pattern generator for identifying variations introduced in signals transmitted over a signal path, the test pattern generator configured to:

generate one or more test patterns with functional features, wherein said functional features are for determining aspects of variations introduced in the one or more test patterns during transmission over the signal path; and include a data pattern in at least one of the test patterns, said data pattern comprising meta-data on functional features of the at least one test pattern.

According to a third aspect of the invention, there is provided a test pattern analyser for identifying variations introduced in signals transmitted over a signal path, the test pattern analyser configured to:

receive one or more test patterns from one or more test pattern generators as described above, wherein at least one of the test patterns comprises a data pattern, said data pattern comprising meta-data on functional features of the at least one test pattern; and determine variations, introduced over the signal path, of the at least one test pattern by means of functional features of the at least one test pattern and by means of said data pattern.

According to a fourth aspect of the invention, there is provided a system for identifying variations introduced in signals transmitted over a signal path comprising:

one or more test pattern generators as described above; and one or more test pattern analysers as described above.

BRIEF DESCRIPTION OF THE DRAWINGS

FIG. 2A illustrates an aligned or synchronised audio-video signal;

FIG. 2B illustrates an audio-video signal wherein the audio signal is delayed in relation to the video signal;

FIG. 2C illustrates an audio-video signal wherein the video signal is delayed in relation to the audio signal;

FIG. 3 illustrates delay correction of offset audio and video signals;

DETAILED DESCRIPTION

General Audio-Video Synchronisation

Figure 1:
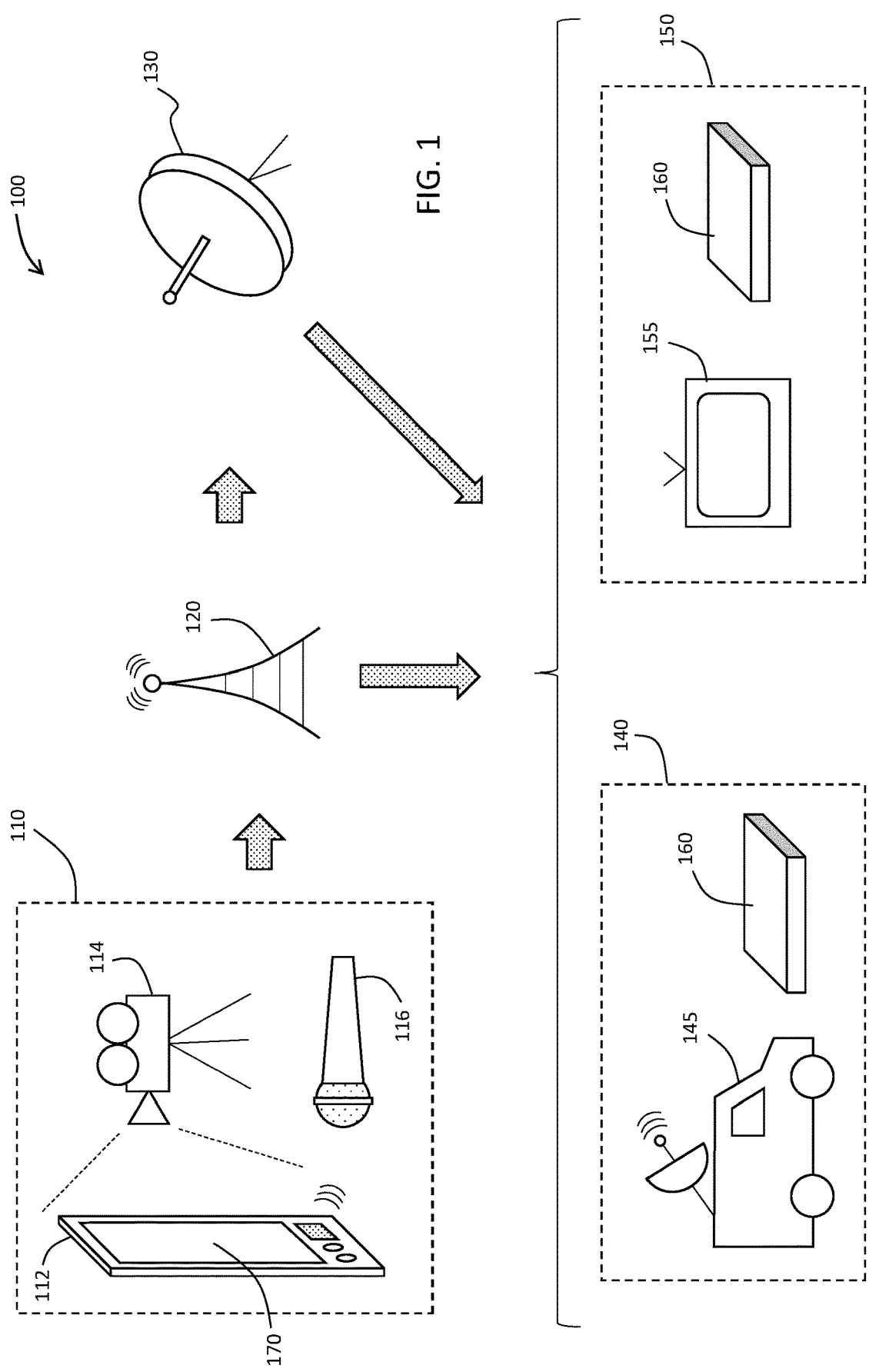
FIG. 1 illustrates a typical broadcasting system including a test pattern generator and a test pattern analyser in accordance with aspects of the present invention.

FIG. 1 illustrates a typical broadcasting system 100 that uses embodiments of the present invention. A movie or live footage may be captured in a television studio or at an event such as a football match, at location 110. In particular, a camera, such as camera 114, is used to capture a video signal, while a microphone, such as microphone 116, is used to simultaneously capture an audio signal. During typical usage, the camera 114 and the microphone 116 may be used to capture live video and audio, for example, live footage of a football match. In such applications, it is important that the video and audio signals are time-aligned to ensure, for example, that "lip-sync" errors do not occur.

It is also important that some types of distortions are measured, such as for example colour or frequency distortions, and the present scheme considers such measurement; the presently discussed example, however, is concerned with audio-video delay.

The video and audio signals from the camera 114 and the microphone 116 are respectively communicated to a broadcasting transmitter, such as for example, broadcasting transmitter 120. The transmitter 120 sends the audio and video signals to receiving entities such as signal receiver 130, outside broadcasting truck system 140 and/or television signal receiver system 150. Thus, the final or intermediate destination of the audio and video signals may be receiving entities such as the outside broadcasting truck system 140 or the television signal receiver system 150.

During transmission of the audio and video signals from the initial location 110 to the final or intermediate destinations 140, 150, the audio signal and video signal may each be subject to a delay. In some circumstances, the audio signal is subject to a different delay to that of the video signal.

In the illustrated implementation, the outside broadcasting truck system 140 comprises an outside broadcasting truck 145 and a test pattern analyser 160. The television signal receiver system 150 has a television 155 and another test pattern analyser 160. As will be described in greater detail below, the test pattern analysers 160 are capable of measuring the delay between received video test patterns and other received test patterns, such as other video test patterns or audio test patterns.

In the above discussion, a single camera and a single microphone are used to capture the video test pattern and the audio test pattern, respectively. In other scenarios, multiple cameras or multiple microphones are used to capture the video test pattern and the audio test pattern, for transmission across different signal paths. The present invention may be used for measuring the delay of signals associated with any number of such cameras or microphones. Further, delay between two or more video signals can be determined, as can delay between two or more audio signals.

FIGS. 2A-2C illustrate the video and audio signals under different circumstances. In FIG. 2A, the audio and video signals are subject to no delay, or are both subject to the same delay. In this case, the video signal 200 and the audio signal 210 are illustrated as being aligned in time. In FIG. 2B, the audio signal 230 is shown as being delayed to a greater extent than the video signal 220. In this case, the video signal 220 arrives at the destination earlier than the audio signal 230, and the video signal 220 and the audio signal 230 are illustrated as not being aligned in time. In FIG. 2C, the video signal 240 is shown as being delayed to a greater extent than the audio signal 250. In this case, the audio signal 250 arrives at the destination earlier than the video signal 240, and the video signal 240 and the audio signal 250 are illustrated as not being aligned in time.

In this exemplary embodiment, it is desirable to measure the different timing between an audio signal and an associated video signal. Such a measurement may then be used to correct the delay of one or both of the signals so that the audio signal and the video signal are time-aligned.

FIG. 3 illustrates a prior art delay correction system. A video signal and an audio signal are captured in a studio or in-field, such as at location 110, and by means of camera 114 and microphone 116. The video signal 300 and the audio signal 310 as shown in FIG. 3 correspond to the signals as captured at the initial location 110; at this stage, the signals are time-aligned and synchronised. The video and audio signals are then transmitted to a final or intermediate destination (for e.g., over a broadcast network). During this transmission, the audio and video signals are respectively subject to different delays and so arrive at the final or intermediate destination without being time-aligned; that is, they are not synchronised. This is shown in FIG. 3 in which the received video signal 320 and the received audio signal 330 are subject to different delays and are not time-aligned.

At step 340, the delay between the video signal and the audio signal is measured. At step 350, the measured delay is used to correct the timing of the respective signals in order to remove the effects of differing delay in the signals. The system outputs video signal 360 and audio signal 370, wherein video signal 360 and audio signal 370 are time-aligned.

It is to be noted that the present scheme is concerned with the measurement of signal delay or distortions, such as a temporal delay between audio and video signals or colour distortions, and not with the correction of any measured delay/distortion.

Figure 4A:
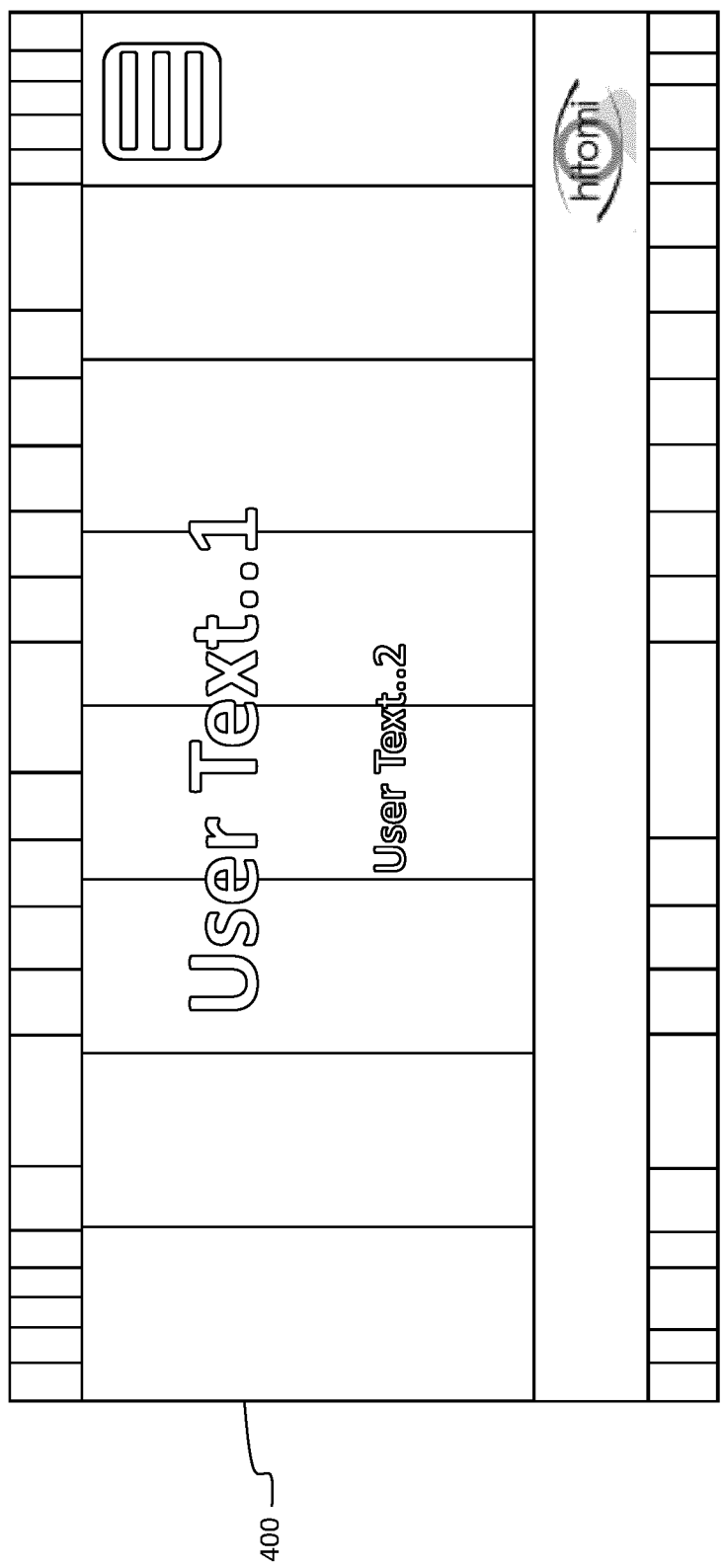
FIG. 4A shows an example of a video test pattern.
Figure 4B:
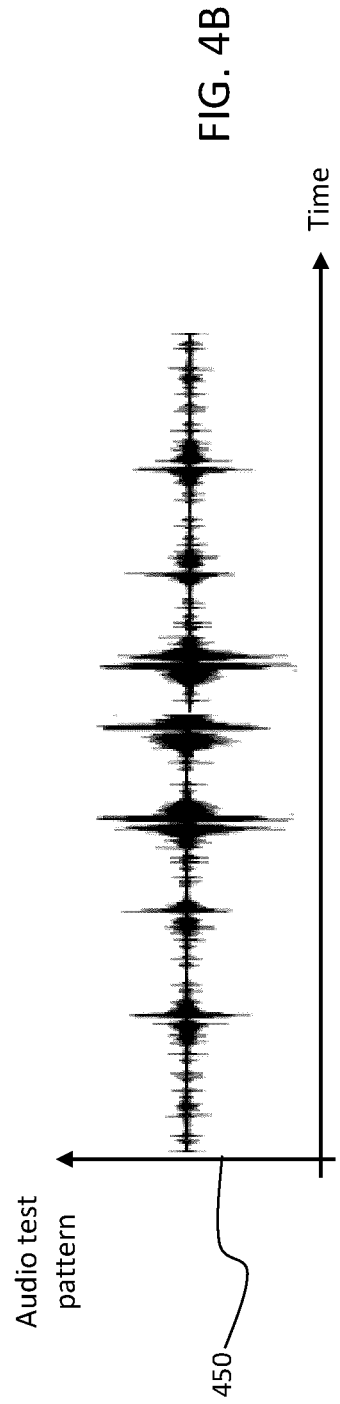
FIG. 4B shows an example of an audio test pattern.

One way to measure the delay between an audio signal and an associated video signal is by means of video and audio test patterns. FIG. 4A shows a typical video test pattern 400 and FIG. 4B shows a typical audio test pattern 450. In particular, during a synchronising phase, instead of transmitting (for e.g. broadcasting) the actual signals of interest (e.g. footage of a football match), the audio and video test patterns 400, 450 are transmitted instead. The audio test pattern 450 has temporal characteristics that are matched in some way to temporal characteristics of the video test pattern 400. For example, the audio test pattern 450 may comprise a pulse that should occur at the same time as a pulse of the video test pattern 400. By using knowledge of such temporal characteristics of the audio and video test patterns 450, 400, a test pattern analyser receiving the broadcast test patterns can ascertain the delay between the received audio test pattern 450 and the received video test pattern 400. Such a test pattern analyser is illustrated in FIG. 1 as test pattern analyser 160.

For example, the video test pattern 400 may comprise a "flash" that is designed to occur at the same time as an accompanying audible click tone burst or other locatable audio feature in the corresponding audio test pattern 450. The test pattern analyser 160 receives the video test pattern 400 and the audio test pattern 450 after the patterns have been transmitted through a processing chain of a broadcasting system 100. By determining the delay between the flash in the received video test pattern 400 and the audible click or beep in the received audio test pattern 450, the test pattern analyser 160 can determine the delay between the received audio and video test patterns 450, 400.

A test pattern generator 170 (see FIG. 1) may be used to generate the video test pattern 400 and the audio test pattern 450. In some embodiments, the video test pattern and the audio test pattern may be displayed or played on a television or some other screen with an audio output. In a preferred embodiment, the test pattern generator 170 is a multi-purpose computing device such as smartphone 112 and the video test pattern 400 is displayed on the screen of smartphone 112. In the preferred embodiment, the audio test pattern 450 is played by the smartphone 112 at the same time as the video test pattern 400 is displayed by the smartphone 112.

Other Uses of Test Patterns

In addition to measuring the delay between received test patterns in order to measure the delay between two signals, test patterns can be used to provide information on certain types of distortion. For example, the colour space of a video may have changed during transmission, or the frequency content of the video may have undergone a transformation. The video test patterns can contain test panels that may be used to determine such distortion. For example, a panel of the video test pattern may be of a predetermined colour. Any change to the colour of this panel can be used to determine the colour distortion of the transmitted video signal.

Similarly, other panels of the video test pattern can provide information on the expected frequency content or gamma characteristics of the video. In principle, the features of the test patterns can be used to measure any delay/distortion introduced in the audio or video signal.

However, the distortion introduced in the test patterns may make it difficult for the analyser to locate these test panels. Toward this end, the present scheme considers sending information embedded in a data pattern, on the functional features of the test patterns (such as a colour test panel) to the analyser. This information comprises meta-data on the functional features, helping the analyser to, for example, locate the functional features.

Transmission of Meta-Data

As explained above, during the transmission of the video test pattern and the audio test pattern, in addition to, or instead of, a time delay, certain distortional effects may appear. For example, the video may be subject to scaling, aspect ratio conversion, conversion of the signal from one resolution to another (spatial resampling) and/or frame rate conversion (temporal resampling).

In the embodiment in which the video test pattern generator 170 is a smartphone 112, depending on how the smartphone 112 is held in front of the camera 114, further distortion of the video test pattern may occur including rotation, further scaling and perspective distortions.

In other embodiments, the location 110 is a virtual studio in which the video image is scaled onto a wall or other surface; video test pattern distortion may occur in embodiments that use virtual studios as well.

Although the functional features of the test patterns can be used to detect delay/distortions in the signals, the distortions also make it hard for an analyser to locate the functional features.

The present solution to this problem is the use of data patterns in the video test pattern or the audio test pattern, the data patterns containing meta-data that facilitates transmission of information about functional features of the test patterns from the test pattern generator 170 (such as smartphone 112) to the test pattern analyser 160. The meta-data can, for example, be used to locate said functional features despite distortion.

The meta-data is sent in such a way that is tolerant of the above described distortions. The meta-data provides information to the test pattern analyser enabling the test pattern analyser to locate functional regions of interest within the video test pattern, and then use these functional regions of interest in further analysis to establish, for example, a relative delay between the audio signal and the video signal, or to establish colour distortion. In some embodiments, the meta-data can also describe aspects of the audio test pattern.

The test pattern generator may itself be a source of uneven delay between the audio and video test patterns. Individual test pattern generators may have unique values of such uneven delay or offset, different to other test pattern generators. The delay or offset of each individual test pattern generator can be measured and stored within the test pattern generator itself, or alternatively in a server, such as a database in a cloud server. This offset can be sent as meta-data embedded in the test pattern, such that the test pattern analyser 160 can use this meta-data to compensate for the uneven delay originating at the test pattern generator.

The meta-data can be used to transmit other information from the test pattern generator to the test pattern analyser. Any information that the test pattern analyser can use to find functional features of test patterns that can, in turn, be used to measure audio-video delay and/or signal distortions, can be incorporated in the transmitted meta-data.

The meta-data is presented in the video test pattern or the audio test pattern as a data pattern within the video or audio test pattern. The data pattern can be a static image, or a spatially and/or temporally modulated image, located within a portion of the video test pattern that is detectable by the test pattern analyser 160 even after the introduction of the above described distortions in the video test pattern. The data pattern can be a static or temporally varying audio data pattern included within the audio test pattern which is detectable by the test pattern analyser 160 even after the introduction of distortions in the audio test pattern.

In some embodiments, the data pattern may be a barcode. In overlapping embodiments, the data pattern may be a number of coloured blocks, wherein the coloured blocks represent the meta-data to be transmitted. In overlapping embodiments, the data pattern may be a digitally modulated audio pattern included in the audio test pattern; many modulation techniques may be employed for example Phase Shift Keying (PSK), Quadrature Phase Shift Keying (QPSK), Quadrature Amplitude Modulation (QAM), Amplitude Shift Keying (ASK) or Frequency Shift Keying (FSK). In overlapping embodiments, the data may be spatially modulated in a data block contained within an area of the video image with techniques for example PSK, QPSK, QAM, ASK or FSK.

Figure 5:
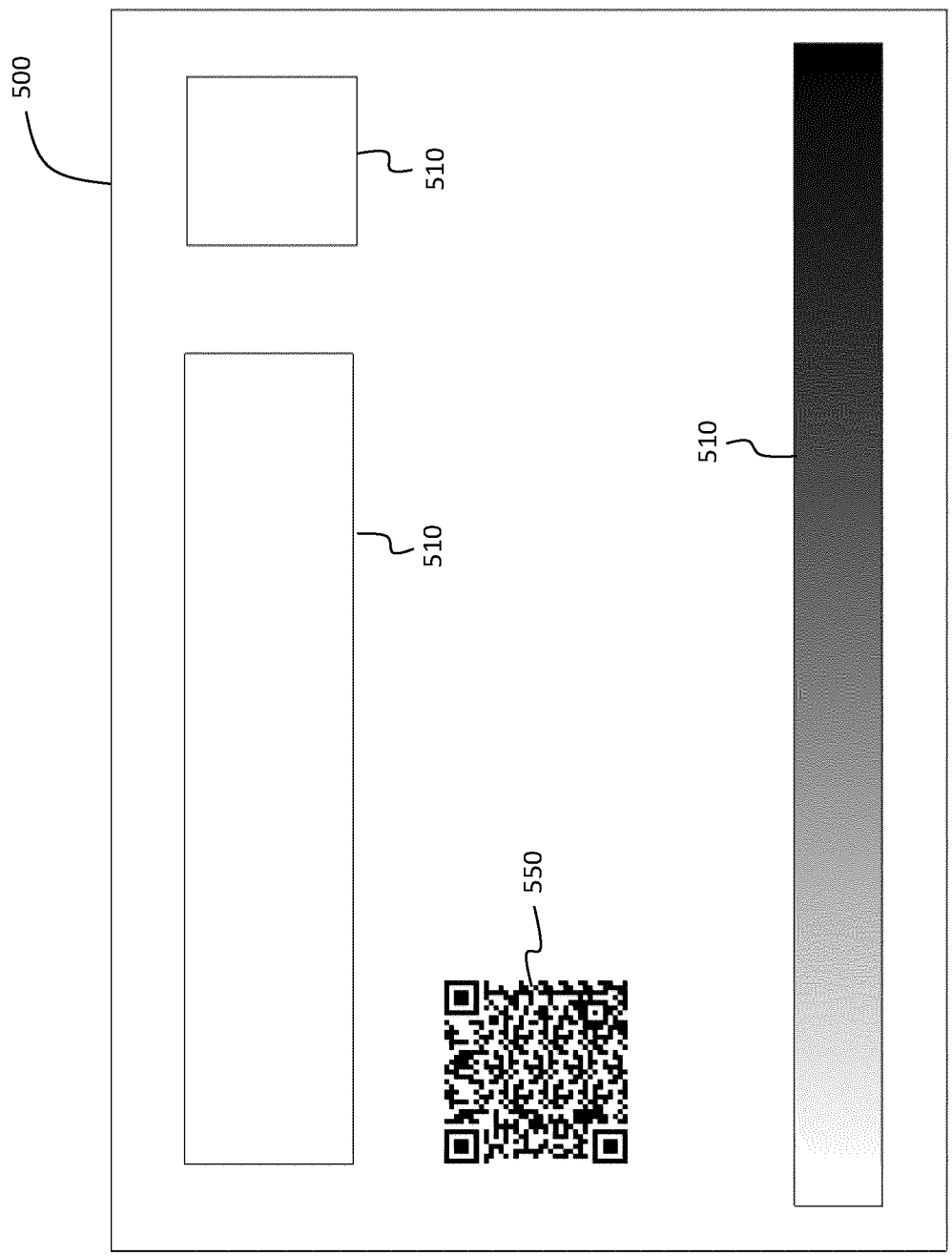
FIG. 5 shows a typical video test pattern including a QR-code in accordance with embodiments of the present invention.

In a preferred embodiment, the data pattern is a QR-code, such as the QR-code 550 illustrated in FIG. 5. Other types of code matrix, matrix barcodes or two-dimensional bar codes may be used. FIG. 5 depicts a video test pattern 500 as well as the individual features 510 of the video test pattern 500. The QR-code 550 contains meta-data that can help the test pattern analyser to, for example, locate the features 510, in order to use the features 510 in the process of measuring audio-video delay or in the process of measuring signal distortion. In general, digital patterns such as a QR-code are preferred because their inherent error correction allows them to be more easily decoded in the presence of noise and have easily detectable features.

In some embodiments, the data pattern contains all of the required spatial information regarding features of the video test pattern. In other embodiments, the information embedded in the QR code is combined with other spatial markers in the video test pattern to facilitate detection and measurement of spatial distortions applied to the video test pattern by the processing chain of the broadcasting network. The data pattern may comprise data that has been encrypted. Alternatively, the data pattern may comprise plain data.

Figure 6:
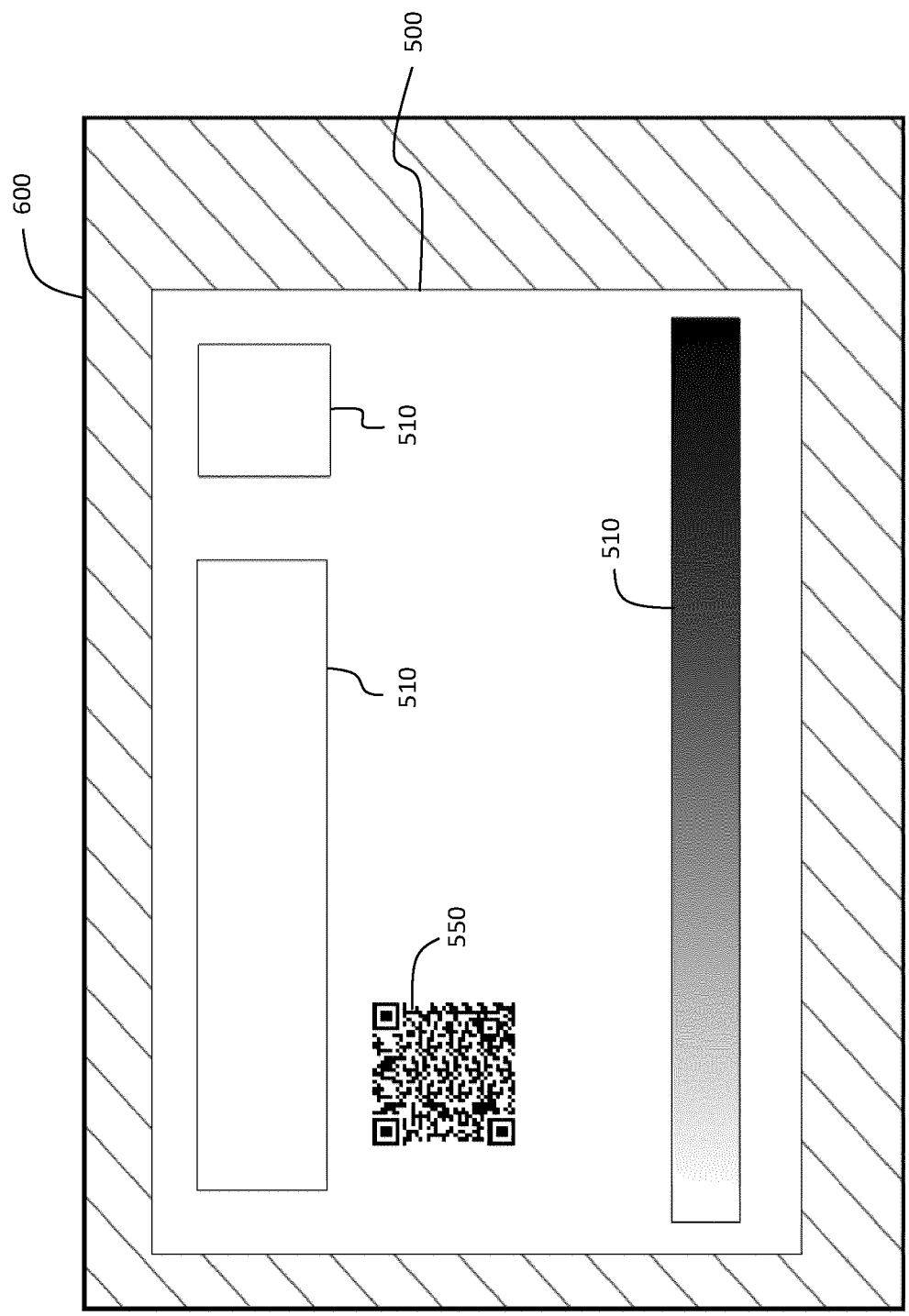
FIG. 6 shows a video test pattern including a QR-code, wherein the video test pattern has been scaled and translated during capture and transmission of the video test pattern.

FIG. 6 shows how the video test pattern 500 appears after the video test pattern has been broadcast and has arrived at an intermediate or final destination. The actual video test pattern received at the test pattern analyser 160 is video test pattern 600, which is different to the video test pattern 500 transmitted by the video test pattern generator 170.

In the example shown, the video test pattern 500 has been subject to translation and scaling, and the individual features 510 of the video test pattern have also been subject to the same translation and scaling. In such circumstances, the test pattern analyser 160 may find it difficult to ascertain the location of the individual video test pattern features such as translated and scaled features 510. In order to address this, the meta-data 550 (shown as a QR-code in FIGS. 5 and 6) contains information on, for example, the positions of the various video test pattern features 510 relative to each other, or relative to the sides of the video test pattern 500. The test pattern analyser can then use the QR-code information in locating the test pattern features and then subsequently use the test pattern features in measuring delay or distortions such as audio-video delay or colour/frequency distortions.

In certain preferred embodiments, the QR-code contains information on its own position, for example, its own position in relation to other test pattern features 510 or in relation to the sides of the video test pattern 500.

In some preferred embodiments, the QR codes vary over time, to provide dynamic and changing meta-data to the test pattern analyser 160.

Figure 7:
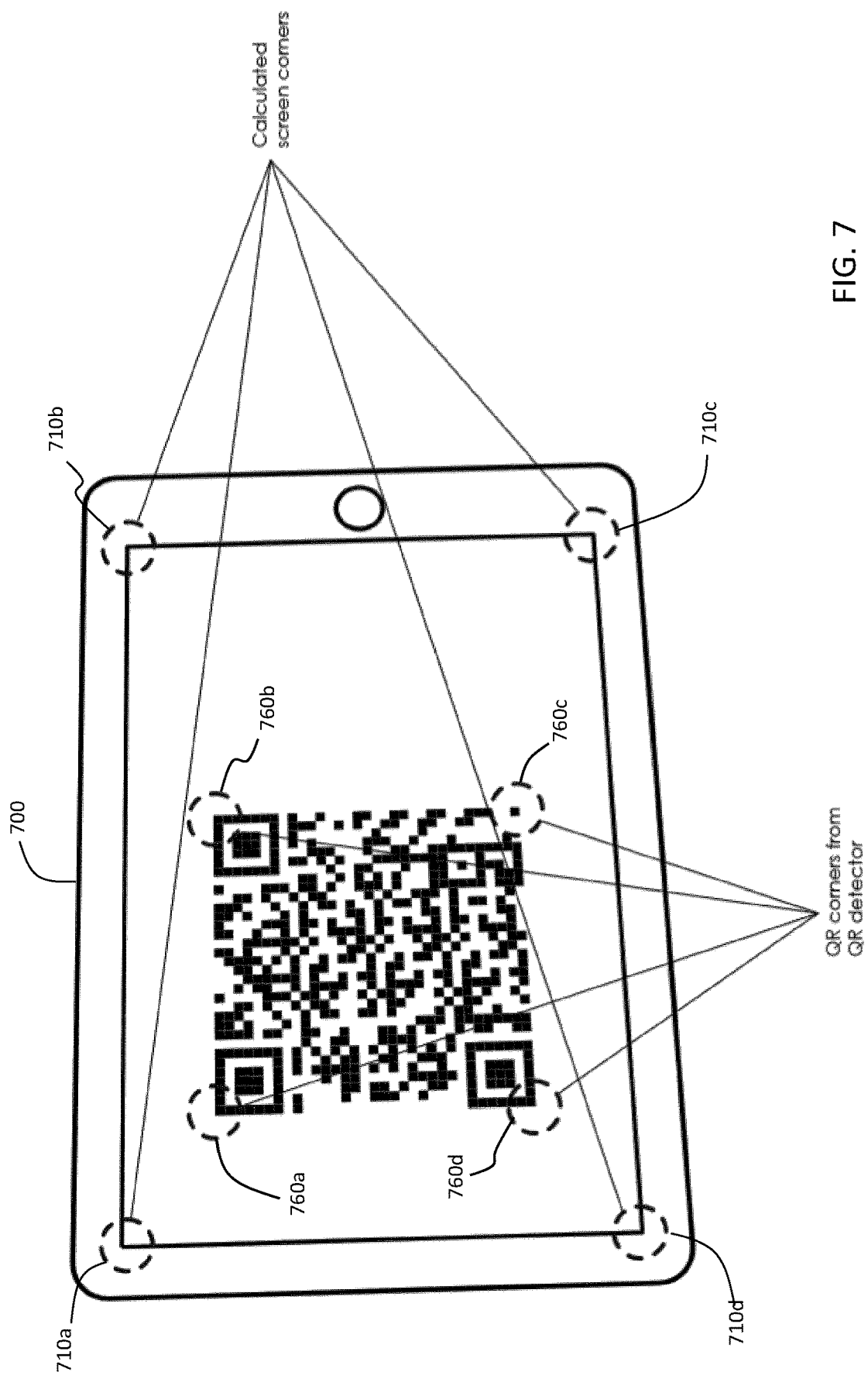
FIG. 7 shows a smartphone displaying a video test pattern including a QR-code, wherein the image of the smartphone is subject to perspective distortion.

FIG. 7 shows a smartphone in the field of view of a camera (the camera is not shown). As described above, the video test pattern is captured by the camera and sent with an audio signal to a test pattern analyser to measure delay/distortions such as the delay between the audio and video signals, or colour/frequency distortions.

As can be seen, the smartphone as it appears in the field of view of the camera, is subject to perspective distortion. Other types of distortion are possible that are not shown in the present example. In order to use the video test pattern shown in FIG. 7, the test pattern analyser needs to ascertain the position of, for e.g. corners or edges, of certain functional regions of interest in the test pattern. Functional regions of interest could include for example, features that vary over time for purposes of delay measurement, colour panels to detect colour distortion, or the QR-code itself. In the illustrated embodiment of FIG. 7, the QR code contains information on the relative locations of the corners 710*a-d* and 760*a-d*. Corners 710*a-d* correspond to the corners of the smartphone, and corners 760*a-d* correspond to the corners of the QR-code, respectively. A video of the smartphone displaying the video test pattern with the QR-code is sent to the test pattern analyser.

The test pattern analyser uses the information embedded in the QR code to determine the positions in the video test pattern of various functional regions or features of interest in the test video pattern. Once the distortion of the audio and video test patterns is overcome by means of this information so that the positions of the functional regions are determinable, the video test pattern can be more effectively used in the process of audio-video delay measurement, or in the process of measuring other processing artifacts such as colour, gamma, or frequency distortion.

Features Locatable Using Meta-Data

The meta-data may comprise data indicating the moment in continuous time of an impulse, a temporal step or other temporally shaped signal represented by sampling in the time axis (as opposed to spatially within the image). The impulse may be in the video test pattern or the audio test pattern. The data indicating the timing of the impulse or temporal signal can be used to either determine an absolute delay of a video test pattern, an absolute delay of an audio test pattern, the relative delay between a video test pattern and an audio test pattern, the relative delay between two video test patterns, or the relative delay between two audio test patterns.

The meta-data may comprise data indicating frequency response tests such as frequency sweeps or bursts in either a horizontal, a vertical or a temporal axis of a video sequence.

The meta-data may include data indicating the location of colour test panels. For example, areas with known colours may be placed in known locations. These can then be used to check that the colour space has been correctly preserved or translated through the signal chain of the broadcasting network.

The meta-data may include data indicating the time of events in associated audio channels. The information about the timing of audio events can be used to either determine an absolute delay of the audio test pattern, or the relative delay between the video and audio test patterns.

The meta-data may include data indicating the time of events in metadata associated with the video. This may be, for example, closed caption information or other time critical data.

The meta-data may include data indicating the location of test panels in the video test pattern. The test panels may be used, for example, to check the linearity of the received video signal. For example, any distortion of the test panels can be used to calculate any non-linearity introduced over the signal chain of the broadcasting network.

The meta-data may include data indicating the location of test panels that can be used to check the gamma characteristics of the signal chain. This may comprise, for example, checking the conversion between High Dynamic range signals and Standard Dynamic range signals which use different gamma curves.

The meta-data may include data indicating the location of test panels that can be used to check for excessive quantisation of the video data passed through the signal chain for example when the signal has been passed through compressed video links.

The tests for linearity/gamma characteristics/frequency response/quantisation may be in one or more of the transmitted colour axes, for instance one or more RGB channel(s), one or more YCbCr channel(s), or any other representation of a 3D colour space or monochrome signal.

The meta-data may include data indicating the location of the QR code within the source image (or other specially designed markers within the source image), so-as to be able to create a reference point for finding other test features in the test video pattern.

The meta-data may include data indicating the identity of any of the test elements in the video test pattern; for example, a test element may be identified as a colour test panel or a frequency content test panel.

The meta-data may comprise the time that test elements in metadata associated with the video stream were generated.

The meta-data may comprise the aspect ratio of the video test pattern.

The meta-data may comprise the height and width of the video test pattern.

The meta-data may comprise the frame rate of the video test pattern or of the audio test pattern.

The meta-data may comprise the time of an event in the video test pattern such as a shaped pulse for "lip sync" measurement. This time may be time referenced to an arbitrary clock. This time may be a precision time acquired by a network protocol e.g. NTP, Network Time Protocol, or PTP, or Precision Time Protocol. This time may be derived from a GPS, Global Positioning System, source. By encoding time meta-data in the video or audio test patterns, the encoded time can be used to determine the absolute delay from the camera lens or microphone, rather than measuring the relative delay between the video and audio signals.

The meta-data may encode information about the current time.

The meta-data may encode information on the source used to determine the current time (e.g. local system clock, NTP, PTP, GPS).

The meta-data may encode information about a precision timing source.

The meta-data may comprise the actual, preferred and/or minimum software/firmware/hardware version of the test pattern generator.

The meta-data may comprise the actual, preferred and/or minimum software/firmware/hardware version of the test pattern analyser receiving the signal from the test pattern generator.

A Scenario Using Multiple Test Pattern Generators

In a scenario such as a football match, the game may be captured from many different locations in the stadium, so that viewers of the captured footage can see the game from many different angles. One camera may be located above the stadium, another camera may be located on a north side of the stadium, and other cameras may be located respectively on south, east or west sides of the stadium.

As in other scenarios, the video signal and the audio signal as captured in each individual location must be synchronised with each other. However, in the scenario of the stadium, an additional requirement is that the signals of the plurality of cameras around the stadium must also be synchronised with each other.

In order to achieve this, the present solution considers using a test pattern generator at each of the locations around the stadium. In a preferred embodiment, the test pattern generator at each location comprises a smartphone or a tablet. During synchronisation, and as described above, the smartphone or tablet may display a video test pattern, play an audio test pattern, and display or play a data pattern.

The present solution, in order to aid synchronisation between signals from cameras in various locations around the stadium, uses a QR-code in each video test pattern containing information regarding the absolute value of the current time, from a precision timing source. This information can then be used to synchronise the different signals from the different cameras.

In some embodiments, the QR-code, audio data pattern or other data pattern can be used to encode the exact time that a video timing pulse or an audio timing pulse was generated. The source of this exact timing information may be NTP, PTP or GPS. If the test pattern analyser also has access to this exact timing information, the absolute latency of the video and audio paths may be determined. This timing information may be used to determine the relative timing of the pulses generated by a plurality of test pattern generators, for example test pattern generators comprising smartphones generating video test patterns and audio test patterns at various disparate locations in the stadium described above.

QR Encoding

In a preferred embodiment, the QR code is Version 4 (33×33) encoded with level M error correction. In this embodiment, each QR code provides 62 bytes of payload.

In embodiments in which the QR code varies over time, one QR code may be generated per second. For example, the QR code may change at certain frames of the video test pattern, such as in frames 30, 90, 150 & 210 of a system that uses 239 frames in a repeating, periodic sequence. In one embodiment, the QR codes are updated once every 4 seconds. In some embodiments, the meta-data is packed into a plurality of QR codes. The rate of QR-code update depends on the rate of variability of the data being encoded by the QR-code.

Meta-Data Structure

The data contained in the QR-code is composed of several blocks containing related information. The first block may comprise a 11-byte 'Identity' block to identify and distinguish between the various QR-codes. For example, each of the generated four QR codes that change at the frames described above may comprise an identity block.

An identity block is followed by several data blocks each containing their type, length and payload. There are several data blocks, some of which may need to be sent more regularly than others. In particular, virtually static information is typically sent less frequently than data that varies over time.

The video test pattern generator determines how the identity block and the data blocks are packed into QR codes; this encoding must conform to the time constraints of the audio and video test patterns.

The above embodiments are described by way of example. Many variations are possible without departing from the invention.

The invention claimed is:

1. A method for identifying variations introduced in signals transmitted over a signal path, the method comprising:
    sending, over the signal path, one or more test patterns with functional features to a test pattern analyzer, wherein said functional features are for determining aspects of variations introduced in the one or more test patterns during transmission over the signal path; and
    including a data pattern in at least one of the test patterns prior to said sending, said data pattern comprising meta-data on functional features of the at least one test pattern;
    wherein at least one of said one or more test patterns comprises a video test pattern or an audio test pattern.

2. The method of claim 1 wherein at least one functional feature of a first test pattern is temporally related to a functional feature of a second test pattern, and wherein said analyzer determines a delay between received versions of the first test pattern and the second test pattern by means of said temporally related functional features and by means of said data pattern.

3. The method of claim 1 wherein the at least one of said one or more test patterns comprises a video test pattern and said data pattern comprises information indicative of the spatial location of functional features of the video test pattern;
and
wherein said information in the data pattern comprises at least one of (i) the location of the functional features of the video pattern in relation to each other, and (ii) the location of the functional features of the video test pattern in relation to edges of the video test pattern.

4. The method of claim 1 wherein the at least one of said one or more test patterns comprises a video test pattern and said functional features of the video test pattern comprise functional features temporally related to functional features in at least one other test pattern.

5. The method of claim 1 wherein the at least one of said one or more test patterns comprises a video test pattern and functional features of the video test pattern comprise one or more test panels whose geometry is useful for measuring spatial distortion of the video test pattern.

6. The method of claim 1 wherein the at least one of said one or more test patterns comprises a video test pattern and said functional features of the video test pattern comprise one or more color test panels whose color is useful for measuring color distortion of at least portions of the video test pattern.

7. The method of claim 1 wherein the at least one of said one or more test patterns comprises a video test pattern and said data pattern comprises information on at least one of (i) the aspect ratio of the video test pattern, (ii) the height of the video test pattern, and (iii) the width of the video test pattern.

8. The method of claim 1 wherein the at least one of said one or more test patterns comprises a video test pattern and one of the functional features of the video test pattern comprises the data pattern, said data pattern comprising an image.

9. The method of claim 1 wherein said data pattern comprises at least one of (i) information on an absolute value of the current time and (ii) a source of the absolute value of the current time.

10. The method of claim 1 wherein said data pattern comprises information indicative of a generator delay between an audio test pattern and a video test pattern, wherein said generator delay originates from a test pattern generator;
and
wherein the value of said generator delay is part of calibration data of the test pattern generator, wherein said calibration data is stored in the test pattern generator, or, in a server connected to a communications network that is accessible to the test pattern generator.

11. The method of claim 1 wherein said data pattern comprises information on at least one of:
functional features usable to detect changes in the frequency content of a test pattern;
functional features usable to detect changes in the gamma characteristics of the test pattern;
functional features usable to detect changes in the quantization of the test pattern;
the identity of features in a test audio pattern and/or in a test video pattern;
the frame rate of the video test pattern and/or the audio test pattern; and
the actual, preferred and/or minimum version of the software, firmware and/or hardware of a test pattern generator.

12. The method of claim 1 wherein said data pattern comprises at least one of:
a binary pattern;
a two-dimensional code matrix, such as a QR-code;
a barcode;
colored blocks; and
an audio burst of modulated data; and
optionally at least one of:
(i) said data pattern varies over time, so that said information in the data pattern is dynamic; and
(ii) data embedded in the data pattern is encrypted.

13. The method of claim 1 wherein the test patterns comprise a test video pattern and a test audio pattern, and wherein the test video pattern, the test audio pattern and the data pattern are generated, displayed and/or played on a multi-purpose mobile computing device;
and
wherein the test video pattern, test audio pattern and data pattern are generated, displayed and/or played on a smartphone or on a tablet.

14. The method of claim 1 wherein said data pattern comprises an identity block and one or more data blocks, wherein the identity block identifies the data pattern and the one or more data blocks provide(s) a payload of the data pattern.

15. A system for identifying variations introduced in signals transmitted over a signal path, the system comprising at least one of:
(i) one or more test pattern generators, configured to:
generate one or more test patterns with functional features, wherein said functional features are for determining aspects of variations introduced in the one or more test patterns during transmission over the signal path; and
include a data pattern in at least one of the test patterns, said data pattern comprising meta-data on functional features of the at least one test pattern;
and
(ii) one or more test pattern analyzers, configured to:
receive the one or more test patterns from one or more test pattern generators, wherein at least one of the test patterns comprises the data pattern, said data pattern comprising meta-data on functional features of the at least one test pattern; and
determine variations, introduced over the signal path, of the one or more received test patterns by means of functional features of the received test patterns and by means of said data pattern;
wherein at least one of said one or more test patterns comprises a video test pattern or an audio test pattern.

16. The system of claim 15 wherein the at least one of said one or more test patterns comprises a video test pattern and said data pattern comprises information indicative of the location of functional features in the video test pattern;
and
wherein said information comprises at least one of (i) the location of the functional features in relation to each other, and (ii) the location of the functional features in relation to edges of the video test pattern.

17. The system of claim 15 wherein said data pattern comprises information on at least one of:

functional features usable to detect changes in the frequency content of a test pattern;

functional features usable to detect changes in the gamma characteristics of the test pattern;

functional features usable to detect changes in the quantization characteristics of the test pattern;

the aspect ratio of a video test pattern, the height of the video test pattern, and/or the width of the video test pattern;

an absolute value of the current time and/or a source of the absolute value of the current time;

a generator delay between an audio test pattern and the video test pattern, wherein said generator delay originates from a test pattern generator;

the identity of features in the test audio pattern and in the test video pattern;

the frame rate of the video test pattern and the audio test pattern; and the actual, preferred and/or minimum version of the software, firmware and/or hardware of the test pattern generator.

18. The system of claim 15 wherein said data pattern comprises at least one of:

a binary pattern;

a two-dimensional code matrix, such as a QR-code;

a barcode;

a set of colored blocks;

a spatially modulated data block; and a burst of modulated audio.

* * * * *